Patented Aug. 16, 1949

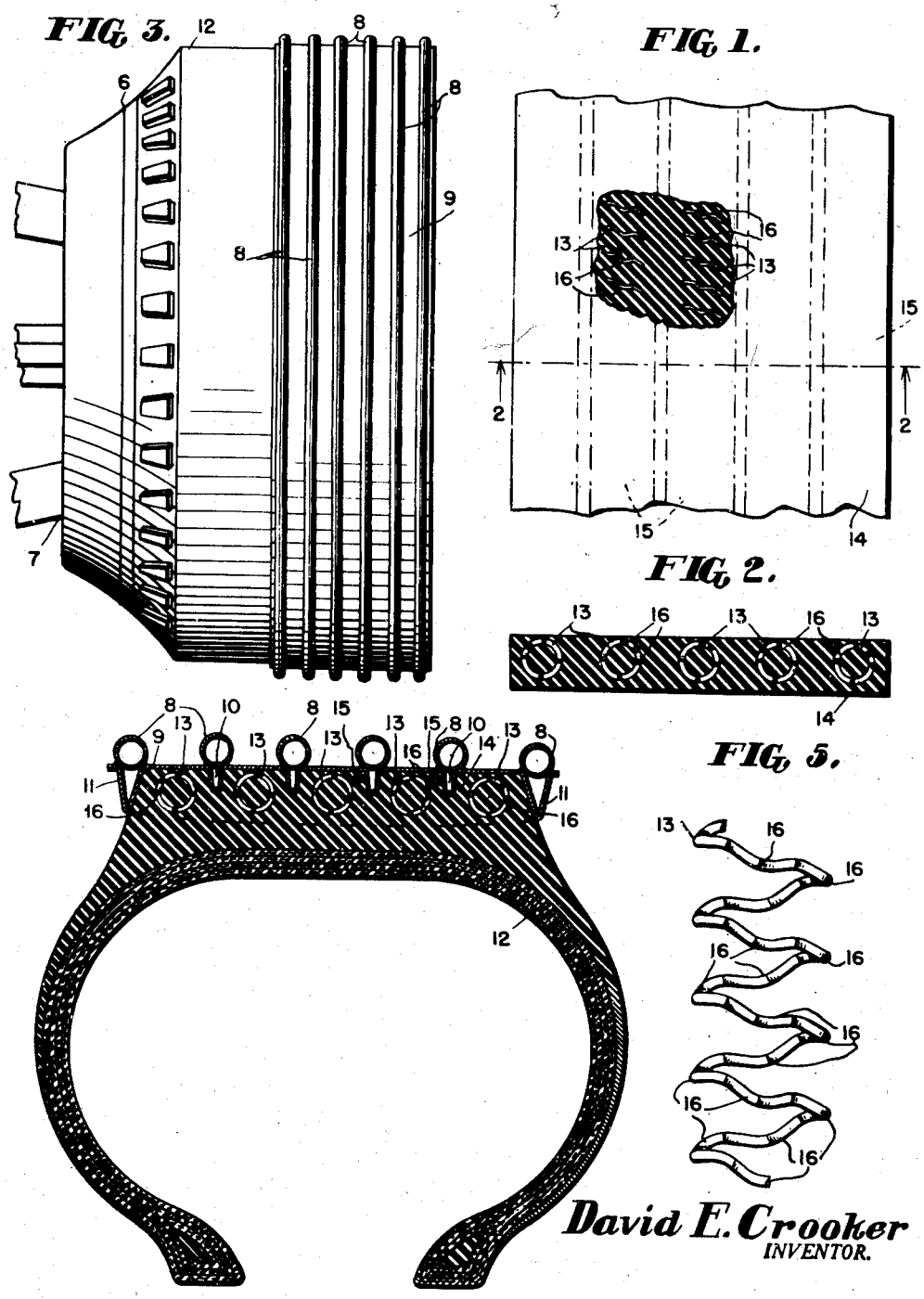
Aug. 16, 1949. D. E. CROOKER 2,479,474
ANTISKID RETREAD FOR TIRES AND METHOD OF MAKING SAME
Filed Dec. 18, 1946
David E. Crooker
INVENTOR.

2,479,474

UNITED STATES PATENT OFFICE 2,479,474

ANTISKID RETREAD FOR TIRES AND
METHOD OF MAKING SAME

David E. Crooker, Ontonagon, Mich.

Application December 18, 1946, Serial No. 716,911

4 Claims. (Cl. 154—14)

The present invention comprises an anti-skid tire retread and method of making same wherein the tread is equipped with means to prevent the tires from skidding or slipping especially on icy thoroughfares.

Objects of the invention are to provide an anti-skid retread, applicable to all standard tires, by use of conventional retreading molds; to provide a ribbed retread, each of the ribs having mounted therein a coiled spring of a diameter substantially equivalent to the thickness of the retread from the surface of the rib to the base of the retread; to provide coil springs each of the coils of which is sinuated in a manner to provide multiple non-angular irregularities extending laterally of the coil; and to provide a retread in which the sinuous or corrugated coils are placed in the tire mold, the tire and camels-back inserted and the retreading consummated in a manner well known in the art.

A further object of the invention is to provide a method of making an anti-skid tire retread comprising using a tire retread mold of conventional design including curing rings with channel forms attached thereto, the channel formers being used to provide ribs on the retread in each of which ribs is mounted the outer portion of a sinuous coil spring, the springs extending completely around the retread and through the latter for effective operation so long as any portion of the tire retread remains on the tire.

Other objects will be understood from the following description taken in connection with the accompanying drawings, wherein;

Figure 1 is a fragmentary plan view of a retread constructed in accordance with the present invention, a portion thereof being broken away to disclose details;

Figure 2 is a transverse sectional view taken on the line 2—2 of Figure 1 looking in the direction of the arrows;

Figure 3 is an elevational view of a contracted tire partially mounted within the curing rings of a retread mold of standard construction;

Figure 4 is a transverse sectional view taken through a tire retreaded in accordance with the teaching of the present invention, a portion of the retread mold being shown on the tire; and Figure 5 is a detail fragmentary plan view of one of the coil springs used in the present invention.

In order to illustrate the application of this invention, I have in Figures 3 and 4 shown a portion of the Hawkinson retread mold, Patent #1,917,262, as indicated at 6. The mold includes a core 7, of standard construction, in conjunction with curing rings 8 associated with a circular mold plate 9 the latter being equipped with inwardly extending radial channel formers 10. The outer margins of the plate 9 are formed to provide restraining annuli 11 to limit the extent of lateral movement of the retread in a manner more fully hereinafter set forth. In Figure 4 I have shown a tire 12, of standard construction, which in this figure, as well as in Figure 3, is contracted and has engaged therewith the mold referred to supra. The tires are of standard construction and a detailed description thereof for the purpose of this invention is unnecessary. However, it is of the essence of importance in the present invention that the tire be contracted in the usual manner in order to permit the application of a retread thereto in accordance with the teaching of this invention.

The steps of the present process are to mount coil springs 13 in the mold, the springs being appreciably spaced, following which the tire 12 and camels-back 14 are inserted. Vulcanization is then effected through the tire mold in order to fuse the camels-back to the periphery of the tire 12. The channel formers 10 divide the camels-back into a plurality of independent ribs 15 which are parallelly arranged. Each of the ribs receives the outer portion of one of the coil springs as advantageously illustrated in Figure 4. As also shown in the same figure and also in Figure 2, it will be noted that the outer surfaces of the springs lie in close proximity to the tread surfaces of the camels-back 14 or retread. The inner portions of the springs extend inwardly appreciably beyond the bases of the ribs 15 but terminate short of the inner surface of the retread. In this connection and as shown to advantage in Figure 4, it will be noted that the circumferential grooves or spaces between the ribs 15 extend radially inwardly from the surface of the camels-back to a point approximating one-third of the diameter of the convolutes or coils of springs 13.

As illustrated to advantage in Figure 5, each coil of the spring is provided with multiple corrugations or sinuosities 16. It is within the contemplation of this invention to provide a spring in which the corrugations provide continuous bends or curves from one extreme to the other in the wire with a complete absence of angular bends. This method of sinuating the wire prevents weakening of its tensile strength since there are no angular bends at any point throughout the length of the wire. Furthermore, by this method there is a minimum stretch of the wire and correspondingly little, if any, molecular displacement through the wires. Experiments have proven that best results are obtained by a 3 point contact for each coil although this number may be increased or diminished if desired. By corrugating or sinuating the wire as herein set out, displacement of the wire in the tread is positively prevented and correspondingly loosening of the wire and loss of fragments thereof is mitigated. The absence of angular curves in the wire increases its longevity even after the tire has been subjected to rough use over a considerable period of time.

It is to be understood that the device of the present invention is especially applicable for use in retreading of tires for winter use for traction over icy or slippery surfaces. The springs are in sufficiently close proximity to the surfaces of the ribs of the retread that an effective purchase of the tread on the road of travel is immediately effected. This becomes more pronounced as the ribs wear and the wires are exposed for engagement with the road of travel. Even after the outer portions of the springs have been worn off, the retread retains its anti-skid propensities.

It is, of course, to be understood that although I have herein described a particular form of an anti-skid medium which I have found to be efficient when used in tire retreads, it is nevertheless to be understood that other anti-skid means may be molded to the tire carcass without departing from the spirit and scope of this invention as covered in the appended claims.

What I claim is:

1. An anti-skid tire retread in combination with a tire carcass and a retread engaged with the periphery of the carcass, the retread comprising a body with multiple channels defining parallelly arranged ribs, and coil springs mounted in the retread, each spring extending radially through a rib of the retread, and each coil of the springs being laterally sinuated.

2. A method of making an anti-skid retread for tires comprising contracting a tire carcass with a mold core and engaging the mold with the carcass periphery, sinuating and coiling lengths of wire to form corrugated coil springs, placing said corrugated coil springs in the tire mold and superimposing a retread body on the springs after which the retread body is fused to the carcass between the springs, and between the coils of the respective springs.

3. A method of making an anti-skid retread for tires comprising laterally sinuating the convolutes of coil springs, placing said coil springs in a retread mold in parallel rows, in conjunction with a tire to be retreaded, superimposing a camels-back on the springs, followed by fusion of the laterally sinuated convolutes, camels-back and tire through the mold.

4. A method of making an anti-skid retread for tires comprising corrugating and coiling lengths of wire to form corrugated coil springs having laterally sinuated convolutes, mounting said coil springs in spaced rows within a retread mold in conjunction with a tire and camels-back, circumferentially grooving the camels-back from the surface of the latter to a point approximating one-third of the diameter of the convolutes of the springs and fusing the camels-back between the rows of springs and between the convolutions of each spring.

DAVID E. CROOKER.

REFERENCES CITED

The following references are of record in the file of this patent:

UNITED STATES PATENTS

| Number | Name | Date |
| --- | --- | --- |
| 1,021,171 | Ward | Mar. 26, 1912 |
| 1,107,672 | Kernen | Aug. 18, 1914 |
| 1,111,419 | Wadsworth | Sept. 22, 1914 |
| 1,159,244 | Midgley | Nov. 2, 1915 |
| 2,006,038 | Yamaki | June 25, 1935 |
| 2,232,001 | Hawkinson | Feb. 18, 1941 |

FOREIGN PATENTS

| Number | Country | Date |
| --- | --- | --- |
| 378,734 | France | Oct. 15, 1907 |

OTHER REFERENCES

Scientific American, May 1943, pp. 224–225.
Popular Mechanics, vol. 28, No. 3, Sept. 1917; page 438 (Copy in Div. 45).